(12) United States Patent
Swabey et al.

(10) Patent No.: US 7,737,220 B2
(45) Date of Patent: Jun. 15, 2010

(54) HIGH DENSITY HOMOPOLYMER BLENDS

(75) Inventors: John William Swabey, Calgary (CA); Patrick Lam, Calgary (CA); Sarah Marshall, Calgary (CA)

(73) Assignee: Nova Chemicals (International) S.A. (CH)

( * ) Notice: Subject to any disclaimer, the term of this patent is extended or adjusted under 35 U.S.C. 154(b) by 666 days.

(21) Appl. No.: 11/206,969

(22) Filed: Aug. 18, 2005

(65) Prior Publication Data

US 2006/0047078 A1 Mar. 2, 2006

(30) Foreign Application Priority Data

Aug. 31, 2004 (CA) .................................. 2479704

(51) Int. Cl.
*C08F 8/00* (2006.01)

(52) U.S. Cl. .................... 525/192; 525/193; 525/194

(58) Field of Classification Search .............. 525/192, 525/193, 194
See application file for complete search history.

(56) References Cited

U.S. PATENT DOCUMENTS

| 6,372,864 | B1 | 4/2002 | Brown ......................... 526/65 |
| 6,419,966 | B1 | 7/2002 | Davis ......................... 426/106 |
| 6,689,847 | B2 | 2/2004 | Mawson et al. ............. 526/116 |
| 6,770,520 | B2 | 8/2004 | Chuang et al. .............. 438/197 |
| 7,153,909 | B2 * | 12/2006 | Van Dun et al. ............. 525/240 |
| 2003/0088021 | A1 | 5/2003 | Van Dun et al. .............. 525/53 |

OTHER PUBLICATIONS

James C. Randall, A Review of High Resolution Liquid 13Carbon Nuclear Magnetic Resonance Characterizations of Ethylene-Based Polymers, JMS-REV. Macromol. Chem. Phys., C29(2 & 3), 201-317 (1989), Marcel Dekker, Inc.

* cited by examiner

*Primary Examiner*—Nathan M. Nutter
(74) *Attorney, Agent, or Firm*—Kenneth H. Johnson

(57) ABSTRACT

A blend of ethylene homopolymers contains at least one blend component having a very low molecular weight and a narrow molecular weight distribution. The blend has surprisingly high density and low hexane extractables. The blend is suitable for the manufacture of a wide variety of plastic goods including extruded goods and molded goods. Plastic film prepared from the blends of this invention have a low Water Vapor Transmission Rate ("WVTR").

4 Claims, No Drawings

HIGH DENSITY HOMOPOLYMER BLENDS

FIELD OF THE INVENTION

This invention relates to a blend of linear ethylene homopolymers. The blend has surprisingly high density. Molded parts prepared from the blend of this invention have excellent modulus (or rigidity), and film which is prepared from the blend of this invention has high resistance to moisture transmission.

BACKGROUND OF THE INVENTION

Polyethylene homopolymer which is prepared with a peroxide initiation in a high pressure polymerization process is a widely available item of commerce that is commonly referred to as high pressure/low density polyethylene (or "HPLD"). Such HPLD generally contains a significant amount of long chain branching (or "LCB"). The presence of the LCB reduces the density of the polyethylene. In addition, the presence of the LCB modifies the melt rheology of the polyethylene in a manner which is desirable for many fabrication processes—especially the production of blown film.

It is also known to produce "linear" ethylene homopolymers by the homopolymerization of ethylene with a coordination catalyst (such as a Ziegler Natta or "Z/N" catalyst). The resulting ethylene homopolymers are essentially free of LCB when prepared with a Z/N catalyst. These linear ethylene homopolymers have sharp melting points, which makes them suitable for some injection molding applications. In addition, plastic film which is prepared from linear ethylene homopolymer has high resistance to moisture transmission (or, alternatively stated, a low water vapor transmission rate or low "WVTR"). A review of plastic films having low WVTR is provided in U.S. Pat. No. 6,770,520 (McLeod et al.).

More recently, "linear" ethylene homopolymers have been produced with so-called single site catalysts (such as "metallocene" catalysts or "constrained geometry" catalysts). A review of homopolymers prepared from metallocene catalysts is given in U.S. Pat. No. 6,419,966 (Davis). Similarly, a review of linear ethylene homopolymers prepared with "constrained geometry" catalysts is provided in 2003/008,8021 A1 (Van Dun '03). In addition, the Van Dun disclosure provides a review of resin blends which contain an ethylene homopolymer blend component having a molecular weight distribution of greater than 2.5 (i.e. a blend component which is not prepared with a single site catalyst). Van Dun specifically teaches that "homopolymers derived from typical single site catalysts have the dual disadvantage of, (a) being unable to attain as high a density for a given molecular weight as comparable Ziegler products; and (b) exhibiting a narrow Mw/Mn across the whole molecular weight range.

We have now discovered certain blends of ethylene homopolymers which contain a homopolymer blend component having a polydispersity of less than 2.5, yet the blends have a surprisingly high density and thereby mitigate the disadvantages described by Van Dun '03.

SUMMARY OF THE INVENTION

The present invention provides a blend of at least two ethylene homopolymer blend components, wherein at least one of said blend components has a molecular weight distribution, Mw/Mn, of less than 2.5 and an Mn of less than 30,000 and wherein said blend characterized by having:

(i) a density which satisfies the inequality:

density (grams per cubic centimeter)>1-0.0093 ln (Mw/1000)

wherein Mw is the weight average molecular weight of said blend;

(ii) an Mw of from 70,000 to 130,000;

(iii) a number average molecular weight, Mn, of less than 30,000;

(iv) a hexane extractables level of less than 5.5 weight %; and (v) a molecular weight distribution such that at least 25 weight % of said blend has an absolute molecular weight of less than 20,000.

DETAILED DESCRIPTION

The blend of this invention is made from at least two ethylene "homopolymer" blend components. As used herein, the term "homopolymer" is meant to convey a conventional meaning—i.e. the polymer is prepared with substantially only ethylene monomer (though it will be recognized by those skilled in the art that very minor amounts—less than 1%—of higher alpha olefins may be present in a conventional "homopolymer" as a result of contamination of the ethylene stream and/or the polymerization medium).

The homopolymer blend of this invention is characterized by having a surprisingly high density, as defined by the inequality:

density (grams per cubic centimeter)>1-0.0093 ln (Mw/1000)

The blends of this invention further contain at least one other homopolymer blend component which has a higher molecular weight than the first blend component. The critical characteristics of the other blend component are set by relation to the first blend component and by the essential characteristics of the blend, i.e. the overall blend must have:

(i) a high density (as defined by the inequality set out above—with a preferred density of greater than 0.955 g/cc);

(ii) an Mw of from 70,000 to 130,000;

(iii) an Mn of less than 30,000 (preferably less than 15,000);

(iv) a level of hexane extractables of less than 5.5. weight % (which sets a limit on the amount of "very low" molecular weight homopolymer or "extractable" homopolymer in the blend); and (v) a molecular weight distribution such that at least 25 weight % (preferably greater than 40 weight %) of the blend has a molecular weight of less than 20,000 (i.e. when the molecular weight distribution of the homopolymer blend is plotted as a conventional "molecular weight versus mass fraction" plot, the cumulative weight % of the blend of this invention is such that at least 25 weight % has a molecular weight of less than 20,000).

It is preferred that at least one other homopolymer blend component also has a narrow molecular weight distribution (Mw/Mn of 2.5 or less).

It is further preferred that the molecular weight distribution of the overall blend be between 7 and 18.

The blends of this invention are characterized by having unusually high density, as will be illustrated in the Examples.

While not wishing to be bound by theory, it is believed that the very high density of blends of this invention is a result of a combination of (i) the low molecular weight of the first blend component (i.e. at least 25 weight % of the blend has an absolute molecular weight of less than 20,000); (ii) the requirement that at least one blend component has a molecular weight distribution (Mw/Mn) of less than 2.5; and (iii) the difference in the molecular weight of the blend components—with the preferred molecular weight distribution being between 7 and 18.

It will be recognized by those skilled in the art that some polyethylene having a very low molecular weight is soluble in hexane. However, in spite of the low molecular weight fraction, the blends of this invention are further characterized by having a low level of hexane extractables. This is important because ethylene polymers which contain high levels of hexane extractables are not suitable for food contact.

The homopolymer blends of this invention may be used to prepare a wide variety of molded or extruded goods. Extruded profiles (such as pipes) and extruded films are preferred. Certain plastic films produced with the present blends have exceptional barrier properties (or, alternatively state, low MVTR). Such films may be monolayer or multilayer. In multilayer films, the blends of this invention may be suitable employed in at least one "skin layer" or "core layer" of a 3, 5 or 7 layer film.

The present blends may be prepared by any conventional blending technique or (in a preferred embodiment) by the homopolymerization of ethylene in a multi reactor polymerization system. If the blends of this invention are prepared by physical blending, than at least one blend component must have a molecular weight distribution (Mw/Mn) of less than 2.5. If the blends are produced by an in-situ polymerization method, then a single site catalyst (which is capable of producing polyethylene having a molecular weight distribution, Mw/Mn, of less than 2.5) must be used in at least one polymerization reactor. The use of a dual reactor solution polymerization process using a "single site catalyst" is especially preferred and is illustrated in the Examples.

Multi reactor polymerization systems are well known to those skilled in the art. A description of the dual reactor solution polymerization system which is preferred for this invention is given in U.S. Pat. No. 6,372,864 (Brown), the disclosure of which is incorporated herein by reference.

The term "single site catalyst" is also well known to those skilled in the art and is used herein to convey its conventional meaning. In general, a single site catalyst will produce ethylene homopolymers having a narrow molecular weight distribution (i.e. Mw/Mn of less than 2.5) in a well mixed polymerization reactor and will copolymerize ethylene with a higher alpha olefin (such as butene, hexene or octene) in a manner that produces a regular distribution of the comonomer within the copolymers.

Examples of single site catalyst systems include the following catalysts: metallocenes, constrained geometry catalysts, or phosphinimine catalysts when used in combination with a methylaluminoxane ("MAO") cocatalyst or a boron activator (such as a trityl or anilinium salt of tetrakis (pentafluorophenyl) boron).

Further descriptions of single site catalysts are provided in U.S. Pat. No. 6,689,847 and the references therein, the disclosures of which are incorporated herein by reference.

It should be noted that the use of a catalyst which does not readily produce long chain branching ("LCB") is preferred. This is because the presence of LCB can reduce the density of the homopolymer blends (which is undesirable for this invention). For example, the constrained geometry catalyst which is disclosed in the aforementioned Van Dun '03 publication may (under certain polymerization conditions) lead to levels of LCB which are not desirable for this invention.

LCB is determined using $^{13}C$ nuclear magnetic resonance (NMR) and is quantified using the method defined by Randall (Rev. Macromol. Chem. Phys. C29 (2 and 3) p. 285-297), the disclosure of which is incorporated herein by reference. The blends of this invention preferably contain less than 0.3 long chain branches per 100 carbon atoms and most preferably contain less than 0.01 long chain branches per 1,000 carbon atoms.

The use of a single site phosphinimine catalyst system in a dual reactor polymerization process to prepare blends of this invention is described in the following, non-limiting Examples.

In the Examples, physical properties of the polymers were measured using the methods described below:

Melt index measurements were made in accordance with ASTM D-1238. ("$I_2$" using a 2.16 kg load at 190° C. and "$I_{21}$" using a 21 kg load at 190° C.)

Density (g/cc) was measured in accordance with ASTM D792. Film density was measured according to ASTM D1505.

Mn, Mw and Mz (g/mol) were determined by Gel Permeation Chromatography and measured in accordance with ASTM D6474-99.

Water Vapor Transmission Rate ("WVTR", expressed as grams of water vapor transmitted per 100 square inches of film per day at a specified film thickness (mils), or g/100 $in^2$/day) was measured in accordance with ASTM F1249-90 with a MOCON permatron developed by Modern Controls Inc. at conditions of 100° F. (37.8° C.) and 100% relative humidity.

Hexane extractables were measured according to ASTM D6474-99.

Polymer conditions and polymer properties are shown in Table 1.

EXAMPLES

Part A.1

(Comparative) Laboratory Polymerizations

This example illustrates the preparation of ethylene homopolymers in a lab scale continuous solution polymerization unit. A single site catalyst was used for the polymerizations. However, only one polymerization reactor was employed (versus the dual reactor system used to prepare the inventive blends). The resulting ethylene homopolymers have a narrow molecular weight distribution ("Mw/Mn") and the high density which would be expected for a linear ethylene homopolymer.

The process was continuous in all feed streams (solvent, monomer and catalyst) and in the removal of product. All feed streams were purified prior to the reactor by contact with various absorption media to remove catalyst killing impurities such as water, oxygen and polar materials as is known to those skilled in the art. All materials were stored and manipulated under an atmosphere of purified nitrogen.

The reactor had internal volume of 71.5 cc. In each experiment the volumetric feed to the reactor was kept constant and as a consequence so was the reactor residence time.

The catalyst solutions were pumped to the reactor independently and there was no pre-contact between the activator and the catalyst. Because of the low solubility of the catalysts, activators and MAO in cyclohexane, solutions were prepared in xylene. The catalyst was activated in situ (in the polymerization reactor) at the reaction temperature in the presence of the monomers. The polymerizations were carried out in cyclohexane at a pressure of 1,500 psi. Ethylene was supplied to the reactor by a calibrated thermal mass flow meter and was dissolved in the reaction solvent prior to the polymerization reactor. Under these conditions the ethylene conversion is a dependent variable controlled by the catalyst concentration, reaction temperature and catalyst activity, etc.

The internal reactor temperature is monitored by a thermocouple in the polymerization medium and can be controlled at the required set point to +/−0.5° C. Downstream of the reactor the pressure was reduced from the reaction pressure (1,500 psi) to atmospheric pressure. The solid polymer was then recovered as slurry in the condensed solvent and was dried by evaporation before analysis. The ethylene conversion was determined by a dedicated on-line gas chromatograph. Data which further describes these experiments are shown in Table 1.

Part A.2

Inventive Polymerizations

These examples used a dual reactor solution polymerization process in which the contents of the first reactor flow into the second reactor. The use of the two reactors provides "in-situ" polymer blends. Both reactors were sufficiently agitated to provide well-mixed conditions. The volume of the first reactor was 12 liters and the volume of the second reactor was 24 liters. The first reactor was operated at a reactor pressure of about 13,000 kPa (about $2.0 \times 10^3$ psi). The second reactor was at sufficiently lower pressure to facilitate continuous flow from the first reactor to the second. The solvent used was methyl pentane. The process is continuous in all feed streams.

The catalyst used in all experiments was a titanium (IV) complex having one cyclopentadienyl ("Cp") ligand, two chloride ligands and one tri (tertiary butyl) phosphinimine ligand, namely: CpTiNP($^t$Bu)3Cl$_2$.

A boron co-catalyst (namely the triphenyl carbenium or "trityl" salt of tetrakis pentafluorophenyl boron) was used in an approximately stoichiometric amount (based on the titanium contained in the catalyst). A commercially available methylaluminoxane ("MMAO7", from Akzo Nobel) was also included in an Al/Ti ratio of about 40/1 as an impurity scavenger. 2,6, di-tertiary butyl hydroxy 4-ethylbenzene was added to the MAO to scavenge free trimethyl aluminum (TMA) in the MAO (in an Al/OH ratio of about 0.5 to 1, based on the Al contained in the TMA). Polymerization conditions and the physical properties of the resulting high density polyethylene ("HDPE") blends are shown in Table 2. As shown in Table 2, the HDPE blends from experiments 3 to 6 and 11 to 13 have unusually high density. These blends contain from 25.4 weight % (experiment 3) to 59.1 weight % (experiment 6) of polyethylene having a molecular weight of less than 20,000 grams per mole, as indicated by the last row of entries in Table 2. The comparative blend from experiment 2 contains only 12.2 weight % of this low molecular weight material.

TABLE 1

Part A.1: Reactor Conditions and Resin Properties

| | Experiment | | |
|---|---|---|---|
| | 9 | 8 | 7 |
| Reactor Conditions | | | |
| Ethylene (g/min) | 1.4 | 1.4 | 2.5 |
| Hydrogen (ppm) to Reactor | 10 | 0 | 0 |
| Solvent (g/min) | 21 | 21 | 21 |
| Reactor Temperature (° C.) | 160 | 160 | 200 |
| Percent Ethylene Converted | 89.3 | 80.3 | 91.4 |
| CpTiNP(t-Bu)3Cl2 to Reactor (microM, Ti) | 0.58 | 0.20 | 0.75 |
| Density | 0.965 | 0.943 | 0.952 |
| Inequality Value | 0.970 | 0.949 | 0.960 |
| Melt Index | 230 | — | 2.9 |
| MFR | — | — | — |
| Mn (g/mol) | 14,800 | 137,000 | 43,100 |
| Mw (g/mol) | 26,100 | 244,700 | 72,300 |
| Mz (g/mol) | 36,700 | 383,400 | 111,100 |
| Mw/Mn | 1.8 | 1.8 | 1.7 |
| Mz/Mw | 1.4 | 1.6 | 1.5 |

TABLE 2

Part A.2: Reactor Conditions and Blended Resin Properties

| | Experiment | | | | | | | |
|---|---|---|---|---|---|---|---|---|
| | 11 | 12 | 13 | 6 | 5 | 4 | 3 | 2-c |
| Reactor 1 | | | | | | | | |
| Ethylene (kg/h) | 46.5 | 44.6 | 44.6 | 33.0 | 51.8 | 23.6 | 33.0 | 33.0 |
| Hydrogen (g/h) | 0.49 | 0.45 | 0.45 | 0.13 | 0.44 | 0.00 | 0.28 | 0.41 |
| Solvent (kg/h) | 384 | 368 | 368 | 281 | 352 | 211 | 281 | 281 |
| Reactor Inlet Temperature (° C.) | 30 | 30 | 30 | 28 | 28 | 27 | 28 | 28 |
| Reactor Temperature (° C.) | 166 | 166 | 166 | 163 | 161 | 161 | 161 | 160 |
| CpTiNP(t-Bu)3Cl2 to Reactor (PPM) | 0.13 | 0.12 | 0.13 | 0.10 | 0.10 | 0.10 | 0.10 | 0.10 |
| Reactor 2 | | | | | | | | |
| Ethylene (kg/h) | 46.5 | 44.5 | 44.5 | 61.0 | 42.4 | 70.7 | 61.3 | 61.3 |
| Hydrogen (g/h) | 29.2 | 22.7 | 35.7 | 33.7 | 21.4 | 9.1 | 9.1 | 3.7 |
| Solvent (kg/h) | 173 | 193 | 193 | 275 | 204 | 344 | 275 | 275 |
| Reactor Inlet Temperature (° C.) | 30 | 29 | 30 | 29 | 27 | 29 | 28 | 28 |
| Reactor Temperature (° C.) | 200 | 196 | 196 | 197 | 203 | 200 | 201 | 203 |
| CpTiNP(t-Bu)3Cl2 to Reactor (PPM) | 0.90 | 0.73 | 0.94 | 0.45 | 0.70 | 0.42 | 0.41 | 0.45 |
| Density (g/cc) | 0.965 | 0.965 | 0.966 | 0.969 | 0.964 | 0.961 | 0.961 | 0.956 |
| Inequality Value | 0.957 | 0.958 | 0.957 | 0.958 | 0.958 | 0.957 | 0.958 | 0.958 |
| Melt Index, $I_2$ (g/10minutes) | 0.94 | 1.05 | 0.97 | 1.06 | 1.01 | 1.19 | 1.33 | 1.25 |
| MFR ($I_{21}/I_2$) | 42 | 40 | 44 | 146 | 54 | 101 | 56 | 30 |
| Mn (g/mol) | 8,660 | 9,950 | 6,640 | 7,090 | 10,500 | 17,400 | 26,200 | 35,600 |
| Mw (g/mol) | 99,100 | 97,000 | 99,500 | 90,100 | 94,600 | 97,700 | 90,300 | 96,500 |
| Mz (g/mol) | 289,100 | 285,800 | 326,300 | 349,200 | 280,100 | 377,100 | 232,000 | 218,800 |
| Mw/Mn | 11.5 | 9.8 | 15.0 | 12.7 | 9.0 | 5.6 | 3.4 | 2.7 |
| wt % <20,000 g/mol | 45.7 | 43.7 | 47.7 | 59.1 | 44.7 | 26.7 | 25.4 | 12.2 |

Part B

Molded Blends

Properties of plaques molded from the HDPE blends from Part A.2 above were tested according to the following ASTM standard methods:

| | |
|---|---|
| Tensile: | ASTM D638-76 |
| Shore D Hardness: | ASTM D2240 |
| Environmental Stress Crack Resistance (ESCR): | ASTM D5397 |
| Dynamic Mechanical Properties: | ASTM D5279 |

In addition, a comparative, commercially available HDPE resin solid under the trademark SCLAIR 19G was also tested and results from this resin are shown in Table 3 as experiment 1-c. (The SCLAIR 19G resin used in this example was made with a conventional Z/N catalyst and had a density of about 0.96 g/cc, a melt index ($I_2$) of about 1.2 and a molecular weight distribution (Mw/Mn) of about 6.4).

The data shown in Table 3 show the excellent flex modulus of the plaques made from the inventive HDPE blends 3 through 6.

TABLE 3

Pressed Plaque Data

| | Sample | | | | | |
|---|---|---|---|---|---|---|
| | 6 | 5 | 4 | 3 | 2-c | 1-c |
| ESCR CTL (hrs) | 2.3 | 3.3 | 2.5 | 1.2 | 1.3 | 1.5 |
| Flexural Modulus at 1% strain (MPa) | 1660 | 1448 | 1421 | 1325 | 1174 | 1197 |
| Yield (MPa) | 33.8 | 31.0 | 30.6 | 29.1 | 27.8 | 28.6 |
| Tensile Strength (MPa) | 48 | 41 | 42 | 40 | 36 | 36 |
| Dynamic Modulus (−30° C., GPa) | 1.62 | 1.34 | 1.18 | 1.20 | 1.16 | 1.16 |

TABLE 3-continued

Pressed Plaque Data

| | Sample | | | | | |
|---|---|---|---|---|---|---|
| | 6 | 5 | 4 | 3 | 2-c | 1-c |
| Dynamic Modulus (25° C., GPa) | 1.17 | 0.93 | 0.80 | 0.82 | 0.77 | 0.73 |
| Dynamic Modulus (50° C., GPa) | 0.76 | 0.61 | 0.53 | 0.55 | 0.52 | 0.48 |

Part C.1

Blown Film

The Ildpe blends numbered 2-c through 6 and comparative Ildpe 1-c were used to prepare films on a blown film line manufactured by Gloucester Engineering Corporation of Gloucester, Mass. The blown film line was fitted with a single screw extruder having a 2.5" (6.35 cm) diameter screw, a 24:1 length/diameter screw ratio and an annular die having a 4" (10.16 cm) diameter. The die gap and output of film conversion were set at 100 mil and 100 lb/hr respectively. The temperature profile of the four-barrel zones were set at 420° F./400° F./400° F./400° F. This yielded an average melt temperature of about 380° F. A dual air ring was used for film cooling. For 1 mil and 2 mil films, the blow up ratios were maintained at 1.5/1 and 2/1 respectively. In most cases, the extruder pressure and amperage of film conversion ranged from 2,600 to 4,800 psi and 25 to 46 amps respectively.

WVTR (water vapor transmission rate) data and hexane extractable data are shown in Table 4. Films 2 through 6 were made from the HDPE blends 2 through 6 which were polymerized in the manner described in Part A.2 (Table 2). Film 1 was prepared from a commercially available high density polyethylene sold under the trademark SCLAIR 19G by NOVA Chemicals Corporation.

TABLE 4

Film Properties Gloucester Film Line

| | Sample | | | | | |
|---|---|---|---|---|---|---|
| | 6 | 5 | 4 | 3 | 2-c | 1-c |
| Film WVTR g/100 in 2/day @ 1 mil gauge | 0.21 | 0.25 | 0.28 | 0.32 | 0.38 | 0.43 |
| Film WVTR g/100 in 2/day @ 2 mil gauge | 0.10 | 0.14 | 0.15 | 0.15 | 0.38 | 0.12 |
| Secant Modulus at 1% strain (MPa), MD | 1145 | 965 | 920 | 889 | 878 | 966 |
| Secant Modulus at 1% strain (MPa), TD | 1747 | 1300 | 1221 | 1067 | 1064 | 1472 |
| Yield Strength (MPa), MD | 29.7 | 27.0 | 28.7 | 28.8 | 25.3 | 29.0 |
| Yield Strength (MPa), TD | 18.9 | 16.6 | 17.6 | 23.1 | 24.8 | 18.3 |
| Tensile Strength (MPa), MD | 43.6 | 47.8 | 53.7 | 50.4 | 49.0 | 50.7 |
| Tensile Strength (MPa), TD | 18.9 | 16.0 | 17.6 | 21.0 | 27.7 | 18.3 |
| Elongation at Break (%), MD | 487 | 580 | 535 | 649 | 697 | 473 |
| Hexane Extractables | 0.56 | 0.40 | 0.22 | 0.21 | 0.19 | 0.50 |

Part C.2

Blown Film

The lldpe blends numbered 11-13 were used to prepare films on a blown film line manufactured by Macro Engineering and Technology of Mississauga, Ontario, Canada. The film line is smaller than the "Gloucester" line used in Part C.1. The aiming points for the average melt temperature and mass throughput rate were about 430-440° F. (221-227° C.) and 37-40 lbs/hr (16.8-18.2 kg/hr). The line was operated with an annular die having a 100 mil die gap and a blow up ratio (BUR) of 2:1 was used to prepare film having a thickness (aiming point) of 1.5 mils. Physical properties of the films are shown in Table 5.

TABLE 5

Film Properties Macro Film Line

| | Sample | | |
|---|---|---|---|
| | 11 | 12 | 13 |
| Film WVTR g/100 in 2/day @ 1 mil gauge | 0.27 | 0.25 | 0.30 |
| Film WVTR g/100 in 2/day @ 2 mil gauge | 0.14 | 0.15 | 0.14 |
| Secant Modulus at 1% strain (MPa), MD | — | — | — |
| Secant Modulus at 1% strain (MPa), TD | — | — | — |
| Yield Strength (MPa), MD | — | — | — |
| Yield Strength (MPa), TD | — | — | — |
| Tensile Strength (MPa), MD | — | — | — |
| Tensile Strength (MPa), TD | — | — | — |
| Elongation at Break (%), MD | — | — | — |
| Hexane Extractables | 0.52 | 0.43 | 0.75 |

What is claimed is:

1. A process to prepare a blend of at least two ethylene homopolymer blend components, wherein at least one of the said blend components has a molecular weight distribution, Mw/Mn, of less than 2.5 and an Mn of less than 30,000; each of said components has a molecular weight distribution, Mw/Mn, of less than 2.5 and wherein said blend characterized by having:

(i) a density which satisfies the inequality:

$$\text{density (grams per cubic centimeter)} > 1 - 0.0093 \ln(Mw/1000)$$

wherein Mw is the weight average molecular weight of said blend;
    (ii) an Mw of from 70,000 to 130,000;
    (iii) a number average molecular weight, Mn, of less than 30,000;
    (iv) a hexane extractables level of less than 5.5 weight %;
    (v) a molecular weight distribution such that at least 25 weight % of said blend has an absolute molecular weight of less than 20,000; and
    (vi) a molecular weight distribution, Mn/Mw, of from 7 to 18, and further characterized that a polyethylene film prepared from said blend has a Water Vapor Transmission Rate, WVTR, of less than or equal to 0.32 g/100 in$^2$/day at a film thickness of 1 mil, as measured by ASTM F 1249-90,
    said process comprising contacting at least on single site polymerization catalyst system with ethylene under polymerization conditions for said ethylene in at least two polymerization reactors and blending together the polyethylene produced in said at least two polymerization reactors.

2. The process according to claim 1 wherein said polymerization conditions are solution polymerization conditions.

3. The process according to claim 1 wherein said at least two polymerization reactors are operated such that a temperature difference of at least 30° C. exists between said at least two polymerization reactors.

4. The process according to claim 2 wherein said at least two polymerization reactors are operated such that a temperature difference of at least 30° C. exists between said at least two polymerization reactors.

\* \* \* \* \*